Oct. 19, 1954     T. M. WEST     2,692,312
GRAVITY ACTUATED ELECTRICAL CIRCUIT OPENER AND CLOSER
Filed March 11, 1953     2 Sheets-Sheet 1

Inventor
Thomas M. West
By Arthur H. Sturges
Attorney

Oct. 19, 1954 T. M. WEST 2,692,312
GRAVITY ACTUATED ELECTRICAL CIRCUIT OPENER AND CLOSER
Filed March 11, 1953 2 Sheets-Sheet 2

Inventor
Thomas M. West
By Arthur H. Sturges
Attorney

Patented Oct. 19, 1954

2,692,312

UNITED STATES PATENT OFFICE 2,692,312

GRAVITY ACTUATED ELECTRICAL CIRCUIT OPENER AND CLOSER

Thomas M. West, Dorchester, Nebr.

Application March 11, 1953, Serial No. 341,665

6 Claims. (Cl. 200—61.47)

This invention relates to gravity actuated electrical circuit openers and closers particularly of the type adapted to be used on tractors, farm implements, and other vehicles where damage is likely to result from the vehicle tilting too much laterally or longitudinally, and in particular a plurality of gravity actuated switch devices which normally hold a circuit closed and which, upon excessive tilting of a vehicle upon which the device is mounted, open the ignition circuit of the engine of the vehicle or stop the fuel supply of the engine, and which, upon return of the vehicle to a safe operating level are operated by gravity to close the ignition circuit or release the fuel supply of the engine.

The purpose of this invention is to provide a gravity actuated device adapted to be installed on a tractor or the like which instantly stops the engine of the vehicle when the angle of inclination of the vehicle, such as a vehicle working on a hillside, approaches a point where the vehicle may tip over either sidewise or longitudinally.

Numerous farmers and farm hands are injured annually by tractors, trucks, and other farm implements working on steep hillsides, turning over, or doing a somersault backwards, due to the extreme mechanical leverage of the gearing of such tractors. It is also possible for trucks carrying highly inflammable materials, such as gasoline, kerosene, and the like to turn over when involved in road accidents and in numerous instances the materials are ignited by the exhaust of the engines, which are still running after the accident.

With these thoughts in mind this invention contemplates a gravity actuated device that shuts off the current or fuel supply to an engine when a vehicle in which the engine is mounted tilts too far or turns over.

The object of this invention is, therefore, to provide means for forming a circuit opening and closing device so that the device may be installed in a tractor, truck, or the like and so that the device is actuated by gravity to stop the engine of the vehicle when the body of the vehicle tilts beyond a predetermined degree.

Another object of the invention is to provide a device for opening a circuit in an emergency in which the circuit is both opened and closed by gravity.

With gravity actuated circuit opening and closing devices adapted for use on tractors and the like where the vehicles operate on different grades and draw different types of implements it is necessary that the devices trip the circuit making and breaking elements with the vehicles at different angles of inclination, and for this reason it is another object of this invention that the device be adjustable without breaking electrical connections to the parts thereof.

A further object of the invention is to provide a combination of circuit opening and closing elements wherein one element may be positioned to operate when the vehicle tilts laterally and the other when the vehicle tilts longitudinally, such as in turning a somersault.

A still further object of the invention is to provide a circuit closing and breaking device which is also provided with a contact for closing a circuit to a valve actuator at the time a circuit through the device is broken.

And a still further object of the invention is to provide a gravity actuated electrical circuit opener and closer adapted to be used for stopping engines of tractors and other vehicles when the angle of inclination of the vehicle reaches a predetermined degree in which the device is of a simple and economical construction.

With these and other objects and advantages in view the invention embodies a rectangular-shaped or box-like casing having a transversely positioned inverted V-shaped tube carried by a panel or back-board pivotally mounted in one end of the casing, and a similar tube carried by a panel or back-board pivotally mounted in the casing and positioned longitudinally thereof, and means for holding the tubes in adjusted positions and for providing electrical connections to mercury in the tubes.

Other features and advantages of the invention will appear from the following description taken in connection with the drawings, wherein.

Figure 1:
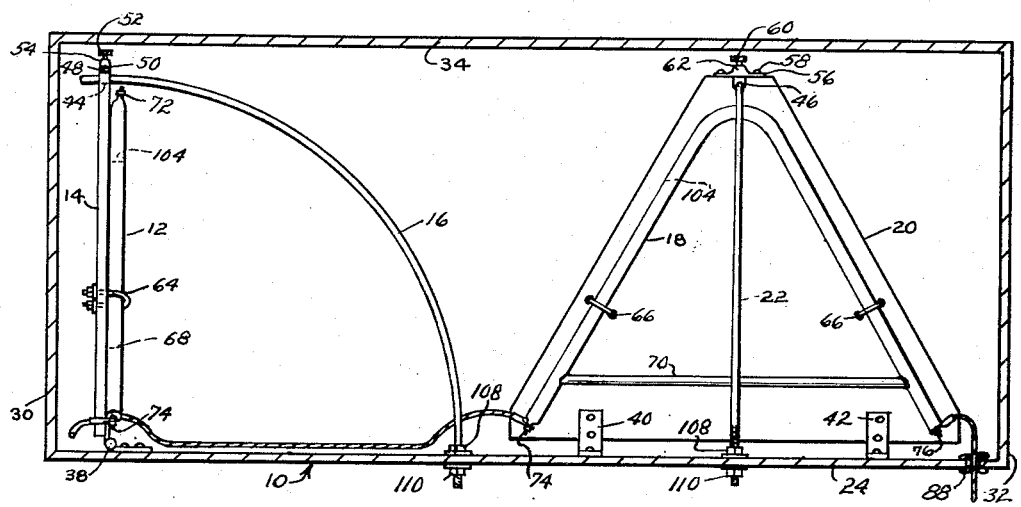
Figure 1 is a longitudinal section through the near side of the casing showing the transverse and longitudinally positioned elements therein, the elements and mounting structure therefor being shown in elevation.

Referring now to the drawings wherein like reference characters denote corresponding parts the improved gravity actuated electrical circuit opener and closer of this invention includes a casing 10, a transversely disposed inverted V-shaped tube 12 mounted on a panel 14 and provided with an arcuate guide rod 16, and a longitudinally disposed inverted V-shaped tube 18 mounted on a panel 20 and provided with an arcuate guide rod 22, and suitable electrical contacts extended into the tubes.

Figure 2:
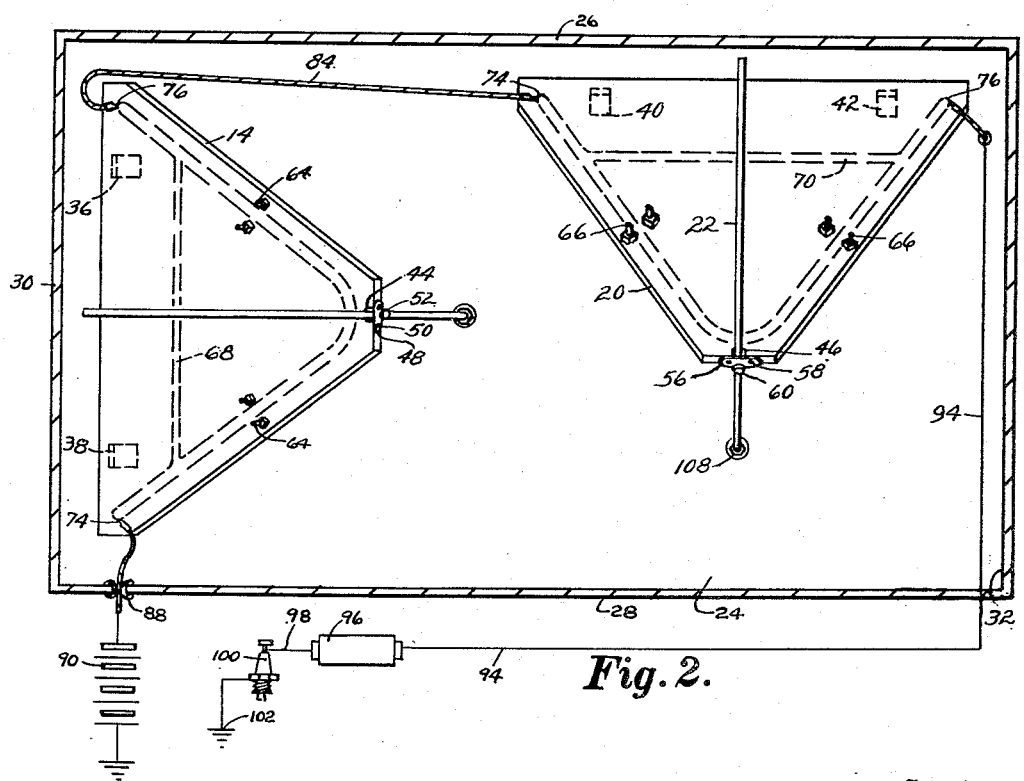
Figure 2 is a sectional plan through the casing with the elements shown in diagonally disposed positions, and showing a wiring diagram in combination therewith.

The casing or box in which the tubes are positioned is formed with a base 24, side walls 26 and 28, end walls 30 and 32, and a cover 34, and, as shown in Figures 1 and 2, the panel 14, upon which the tube 12 is mounted, is pivotally connected to the base 24 with hinges 36 and 38, and the panel 20 on which the tube 18 is mounted, is pivotally connected to the base with hinges 40 and 42. The panels are triangular-shaped and the upper edges are provided with notches through which the rods 16 and 22 extend. The panel 14 is provided with a notch 44 and a similar notch 46 is provided in the panel 20.

The notch 44 of the panel 14 is covered with a closure plate 48 which is secured to the end of the panel with screws 50 and a set screw 52, which is threaded in a boss 54 on the plate, extends into the notch to engage the guide rod 16 for retaining the panel in a vertical position as shown in Figure 1, or in angularly disposed intermediate positions, such as illustrated in Figure 2.

The notch 46 of the panel 20 is provided with a similar closure plate 56 which is secured to the upper end of the panel with screws 58 and this plate is also provided with a set screw 60 which is threaded in a boss 62 of the plate and which extends into the notch 46 to engage the guide rod 22 for retaining the panel 20 and tube 18 in adjusted positions.

The tube 12 is secured to the face of the panel 14 with U-bolts 64, and similar U-bolts 66 hold the tube 18 on the panel 20.

The tube 12 is provided with a connecting tube 68 which is of a smaller diameter than that of the tube 12 and the tube 68, which is spaced from the lower ends of the legs of the tube 12 provides restricted communicating means between the ends or legs of the tube. A similar connecting tube 70 extends between the legs or lower ends of the tube 18 also providing restricted communicating means between the legs of the tube.

Each of the tubes 12 and 18 is provided with three electrical connectors or electrodes, one, as indicated by the numeral 72 being positioned at the top or vertex, and others, as indicated by the numerals 74 and 76, being extended through the lower ends of the legs. Each electrode is provided with spaced annular collars 78 and 80 which, with the electrodes fused in the glass of the tubes, are positioned on opposite sides of the glass walls of the tubes. The electrodes are also provided with nuts 82 for securing wires to the contacts of the tubes.

In the design shown, the tubes are connected in series with a wire 84 connecting the lower ends of legs of the tubes 12 and 18, and with the lower end of the opposite leg of the tube 12 connected by a wire 86, which extends through a grommet 88 in the side wall 28 of the casing, to a battery 90 which is grounded, as shown at the point 92, to the frame of the vehicle. The opposite leg of the tube 18 is connected with a wire 94 to a coil 96 that is connected by a wire 98 to a spark plug 100, and the spark plug is grounded to the frame of the vehicle, as shown at the point 102.

With the parts connected in this manner, mercury, as indicated by the numeral 104, in the tubes connects the electrodes or contacts in the lower parts of the legs of the tubes, thereby completing the ignition circuit of the engine of the vehicle while the vehicle is in an upright or safe position, however, should the vehicle tilt, either laterally or backwardly until the mercury leaves the electrodes the ignition circuit of the vehicle is broken and the engine stops. By the same means, the mercury is returned by gravity to again engage the contacts to complete the circuit when the vehicle returns to a safe operating position.

The upper parts of the tubes are provided with air pockets 106 whereby the electrodes in the vertexes of the tubes are spaced from the mercury when the vehicle is in a safe operating position, however, upon tilting of the vehicle to a predetermined degree the mercury may engage these electrodes and complete a circuit to a solenoid or other device for closing a valve in the fuel supply of the engine, or for shutting off the fuel by other suitable means.

Figure 3:
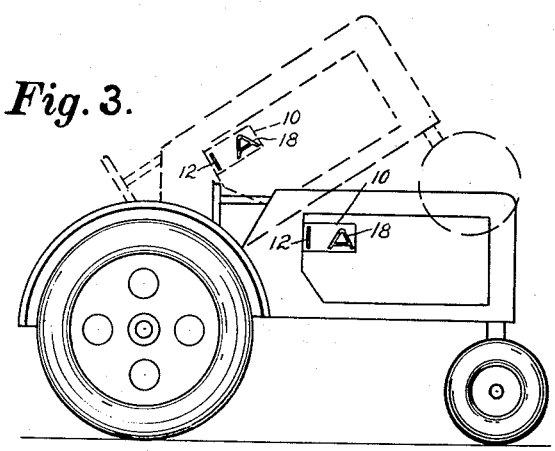
Figure 3 is a side elevational view illustrating the position of the device on a tractor, the tractor being shown in an inclined position in broken lines.
Figure 4:
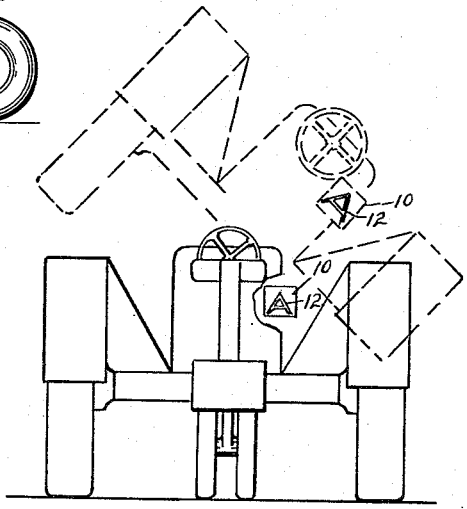
Figure 4 is an end elevational view also illustrating the use of the device on a tractor and also showing the tractor in a laterally tilted position in broken lines.
Figure 5:
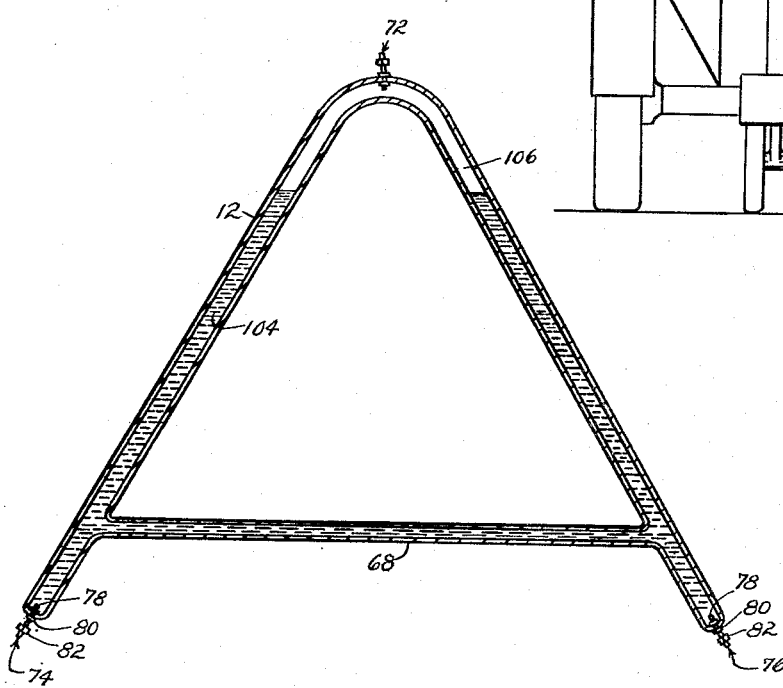
Figure 5 is a detail showing one of the tubes of the device, the tube being shown in section and on an enlarged scale.

The casing may be mounted on a tractor or other vehicle, as illustrated in Figures 3 and 4, and with the positions of the tubes adjusted on the guide rods 16 and 22, particularly as shown in Figure 2, the device may be set whereby the circuit will be broken as soon as the vehicle tilts or somersaults to a predetermined degree, and as the engine stops the operator is warned that the vehicle is about to turn over.

The guide rods extend through the base 24 of the casing and these rods are secured in position with lock nuts 108 and 110.

It will be understood that the contacts of the tubes may be connected to operating parts of a vehicle by circuits other than the circuits shown and described.

From the foregoing description it is thought to be obvious that a gravity actuated electrical circuit opener and closer constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. A gravity actuated switch comprising an inverted V-shaped tube having a restricted cross connection spaced from the lower ends of the tube and having electrical contacts in said lower ends, and mercury partially filling said tube.

2. A gravity actuated electrical circuit opener and closer comprising a pair of inverted V-shaped tubes, partially filled with mercury, and having cross connections between the legs of the tubes providing communicating means between the lower parts of each tube, and means for mounting the tubes on a vehicle with one of said tubes positioned transversely of the vehicle and the other tube positioned longitudinally of the vehicle, said tubes having electrical connections in the lower ends.

3. A gravity actuated electrical circuit opener and closer comprising a pair of inverted V-shaped tubes, each of said tubes having a cross connection providing communicating means between extended ends thereof and having electrical contacts in said extended ends, said tubes being partially filled with mercury, and means for mounting the tubes on a vehicle with one of said tubes positioned transversely of the vehicle and the other longitudinally of the vehicle and wherein the positions of the tubes are adapted to be adjusted.

4. In a gravity actuated electrical circuit opener and closer the combination which comprises a casing, an inverted V-shaped tube having a restricted cross connection spaced from the lower ends positioned in the casing, a panel hinged in the casing, means mounting the tube on the panel, means for adjusting the angular position of the panel with the tube thereon, electrical contacts in the lower ends of the tube, and an electrical conducting fluid partially filling said tube.

5. In a gravity actuated electrical circuit opener and closer, the combination which comprises a base, a triangular-shaped panel positioned on and hinged to the base, another triangular shaped panel also positioned on and hinged to the base and positioned at a right angle to the former panel, an inverted V-shaped tube having a cross connection spaced from the lower ends of legs thereof mounted on each of said panels, contacts positioned in the lower ends of the legs of the tubes and also in the vertexes thereof, said tubes having electrical conducting fluid therein, and means for retaining the panels and tubes in adjusted angular disposed positions on the base.

6. In a gravity actuated electrical circuit opener and closer, the combination which comprises a base, a triangular-shaped panel positioned on and hinged to the base, another triangular shaped panel also positioned on and hinged to the base and positioned at a right angle to the former panel, an inverted V-shaped tube having a cross connection spaced from the lower ends of legs thereof mounted on each of said panels, the diameter of said cross connection being less than that of the tube, electrical contacts positioned in the lower ends of the legs of the tubes and also in the vertexes thereof, said tubes being partially filled with mecury, the upper ends of said panels having notches therein, arcuate rods mounted on the base and extended through the notches of the panels, set screws carried by the panels and positioned to clamp the rods in the notches of the panels for retaining the panels in adjusted angularly disposed positions, and a casing extended upwardly from the base enclosing the tubes and panels.

References Cited in the file of this patent

UNITED STATES PATENTS

| Number | Name | Date |
|---|---|---|
| 1,633,386 | Rutledge | June 21, 1927 |
| 1,694,479 | Milton | Dec. 11, 1928 |